Patented Apr. 15, 1952

2,592,544

UNITED STATES PATENT OFFICE 2,592,544

PENTAERYTHRITYL PHOSPHORIC ACID ESTERS OF CELLULOSE AND PROCESSES OF MAKING THE SAME

George C. Daul and John D. Reid, New Orleans, La., assignors to the United States of America as represented by the Secretary of Agriculture No Drawing. Application April 25, 1950, Serial No. 158,056

13 Claims. (Cl. 260—219)

(Granted under the act of March 3, 1883, as amended April 30, 1928; 370 O. G. 757)

This invention relates to novel derivatives of cellulose, particularly pentaerythrityl phosphoric acid esters of cellulose, having valuable ion-exchange properties. It has among its objects the preparation of these novel cellulose derivatives and the provision of methods whereby they are produced.

Phosphorylated cotton cellulose has been prepared in the past by a process involving the phosphorylation of cotton cloth or linters and its properties of ion-exchange are known.

According to our invention, we have discovered that phosphorylated cellulose possessing a high ion-exchange capacity may be prepared by reaction between a cellulosic material such as cotton cloth, cotton linters, alpha cellulose, and the like with pentaerythrityl phosphoric acid or its ammonium salts. The phosphorylated cellulose thus produced possesses an ion-exchange capacity in excess of previous phosphorylated cellulose, by reason of greatly increased content of free phosphoric acid groups. In addition the ammonium salts confer flame resistance to the cotton material.

The pentaerythrityl phosphoric acid, sometimes termed pentaerythrityl phosphate, which we employ in our invention, may be prepared by reaction between pentaerythritol and a phosphorylating agent such as phosphorus oxychloride, phosphoric acid and phosphorus pentoxide, or urea phosphate. A particularly advantageous method for its preparation involving the use of urea phosphate is described and claimed in our copending application, Serial No. 158,055 filed April 25, 1950.

The pentaerythrityl phosphoric acid, or preferably its urea or ammonium salt is caused to react with cellulose, particularly cotton, by employing a solution of the reagent which is added to the cotton, preferably by padding. The reaction mixture thus produced, comprising cotton and the pentaerythrityl phosphate, is then heated to a temperature within the range of 130° to 160° C. for a period of about 15 minutes. The time necessary to complete the reaction varies with the temperature employed. For example, at 130° C. the reaction proceeds relatively slowly, while at the temperatures in the upper limits some charring of the cellulose occurs unless care is taken to avoid momentary overheating. In general, the time required will be within the range of 30 minutes at the lower temperature to ten minutes near 160° C.

We have discovered that retreatment at the lower temperatures will give a product with approximately the same properties as a single, high-temperature treatment.

In carrying out the process of our invention, we prefer to add an amount of urea or other degradation preventative agent to the reaction mixture. It is possible that there is some cross linkage between the phosphoric acid groups of the pentaerythrityl esters of cellulose, nevertheless, there are a large number of free phosphoric acid groups still available after reaction, and this structural characteristic of the product renders it valuable for ion exchange and other purposes which will be apparent to those skilled in the art.

A typical product of our reaction between pentaerythrityl tetra-phosphate and cellulose (after acidification) would be:

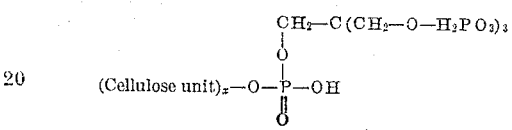

Where $x$ varies with the number of cellulose units.

Where the end use is for ion-exchange, the tetraphosphate of pentaerythritol is naturally preferred for the reaction over the less-substituted derivatives because of its higher phosphoric acid content.

The following examples illustrate the invention:

*Example 1*

A mixture of 193.2 grams of 85% orthophosphoric acid and 200 grams of urea were heated to solution. To this was added 50 ml. of water and 50 grams of pentaerythritol. The mixture was heated on a hot plate until the temperature rose to 130° C. It was then transferred to an oven with air circulation and heated for one and one-half hours at 150° C. The product was a white crystalline mass suitable for subsequent reaction or, if preferred, may be recrystallized from water. Phosphorus content 23.3%, corresponded to the monoammonium tetraphosphate. (Theoretical 23.7%.)

*Example 2*

To 50 grams of finely powdered pentaerythritol was added 150 ml. of phosphorus oxychloride in 200 ml. of benzene in small portions. The mixture was refluxed for eleven hours. The crystalline product was filtered and washed with dry benzene. It was added to water to hydrolyze it to the acid form. This mixture was added to acetone and separated with petroleum ether.

The separation from acetone was repeated until the fraction containing the product was practically chloride-free. The pentaerythrityl phosphoric acid was neutralized with ammonium hydroxide to produce the mono-ammonium salt, which crystallized on cooling. Phosphorus content 21.8% corresponded to the triphosphate.

*Example 3*

Fifteen grams of the product from Example 1 was put into solution with 35 ml. of water to which 15 grams of urea were added and dissolved. This was padded on cloth to about 100% takeup of liquid to weight of cloth, and air dried. The cloth was cured at 140° C. in an oven with air circulation for 15 minutes. It was then washed with hot water, converted to the free acid form with dilute hydrochloric acid, washed with distilled water and dried. The phosphorus content was 3.0% and the total cation-exchange capacity was 1330 m. e./kg. (based on sodium removed from 0.1 N sodium hydroxide solution. This method is described in Analytical Chemistry 21, 87, (1949)). As indicated above, the cloth is of cotton.

The invention herein described may be manufactured and used by or for the Government of the United States of America for governmental purposes throughout the world, without the payment to us of any royalty thereon.

Having thus described our invention, we claim:

1. A process for preparing a pentaerythrityl phosphoric acid ester of cellulose having ion-exchange properties, comprising reacting a material comprising cellulose with a mixture essentially consisting of urea and a substance taken from the group consisting of a pentaerythrityl poly-phosphoric acid and its ammonium salts at a temperature in the range of about 130° C. to 160° C.

2. The process of claim 1 in which pentaerythrityl tetra-phosphoric acid is employed.

3. The process of claim 1 in which an ammonium salt of pentaerythrityl tetra-phosphoric acid is employed.

4. The process of claim 1 in which pentaerythrityl tetra-(mono-ammonium) phosphoric acid is employed.

5. The process of claim 1 in which the said substance is the reaction product of orthophosphoric acid, urea, and pentaerythrityl and has a phosphorus content of about 23.3%.

6. A product of the group consisting of pentaerythrityl poly-phosphoric acid ester of cellulose having ion-exchange properties and free phosphoric acid, namely

groups, in which the cellulose molecule is esterified to form the linkage: cellulose unit

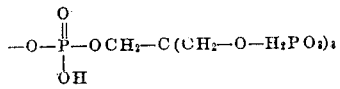

and ammonium salts thereof.

7. A product of claim 6 in which the poly-phosphoric acid is tetra-phosphoric acid.

8. The ammonium salt defined in claim 6.

9. The ammonium salt defined in claim 6 in which the poly-phosphoric acid is tetra-phosphoric acid.

10. The process of claim 1 in which the material comprising cellulose is cotton cloth.

11. The process of claim 1 in which the material comprising cellulose is cotton linters.

12. The process of claim 1 in which the material comprising cellulose is alpha cellulose.

13. The product of claim 6 in which the cellulose is cotton.

GEORGE C. DAUL.
JOHN D. REID.

REFERENCES CITED

The following references are of record in the file of this patent:

UNITED STATES PATENTS

| Number | Name | Date |
|---|---|---|
| 2,008,986 | Malm et al. | July 23, 1935 |
| 2,265,585 | Urbain et al. | Dec. 9, 1941 |
| 2,470,042 | McLean et al. | May 10, 1949 |
| 2,472,335 | McLean et al. | June 7, 1949 |
| 2,482,755 | Ford et al. | Sept. 27, 1949 |
| 2,482,756 | Ford et al. | Sept. 27, 1949 |